June 30, 1936.  W. W. AUSTIN  2,046,234
AGRICULTURAL IMPLEMENT
Filed Feb. 23, 1935   2 Sheets-Sheet 1
Fig.1.
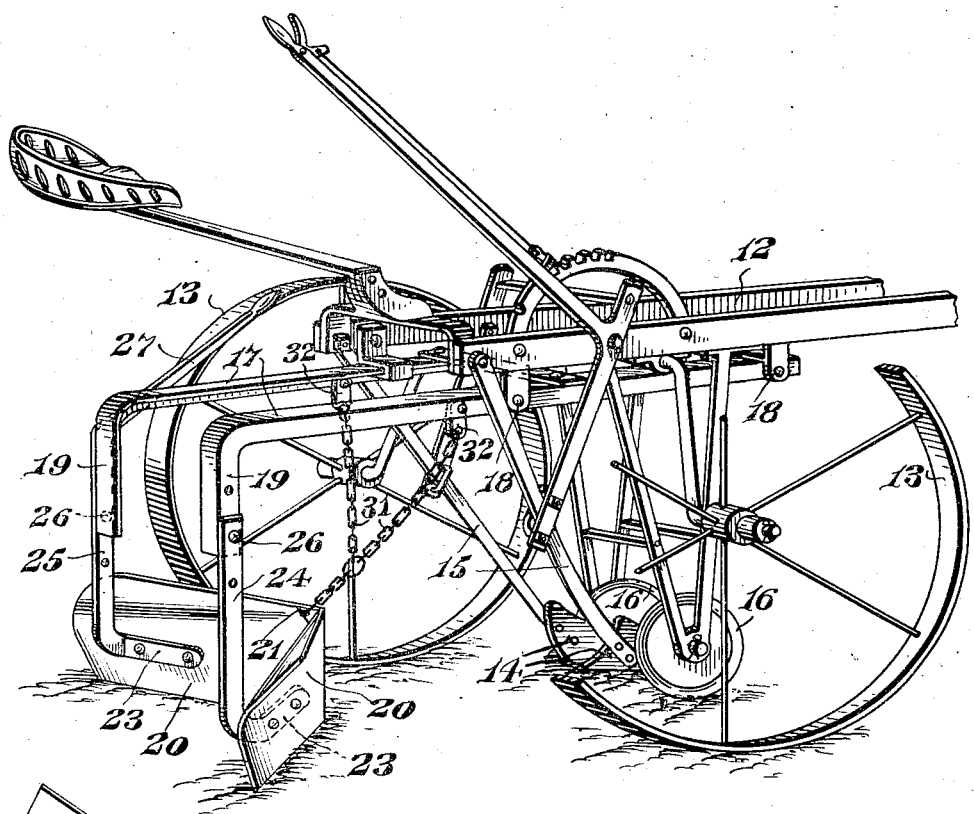
Fig.3.
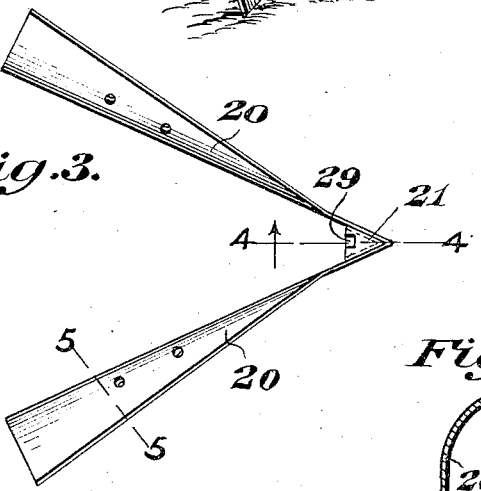
Fig.4.
Fig.5.
Inventor
Willis W. Austin,
By [signature]
Attorney June 30, 1936. W. W. AUSTIN 2,046,234
AGRICULTURAL IMPLEMENT
Filed Feb. 23, 1935 2 Sheets-Sheet 2
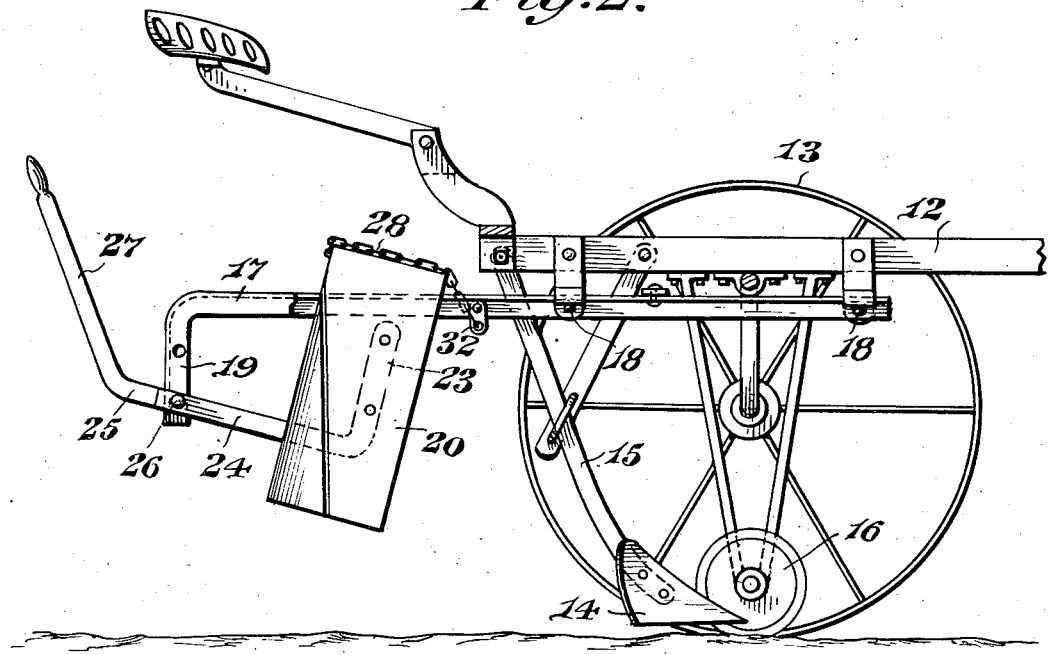
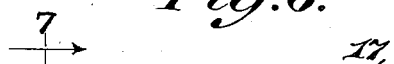
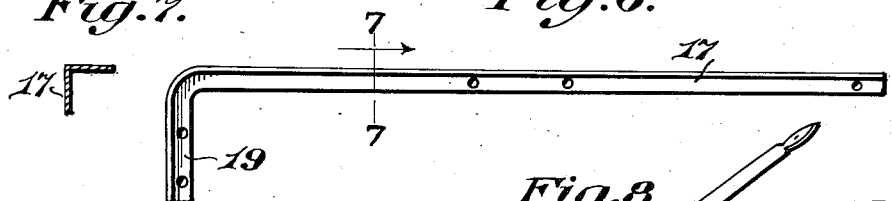
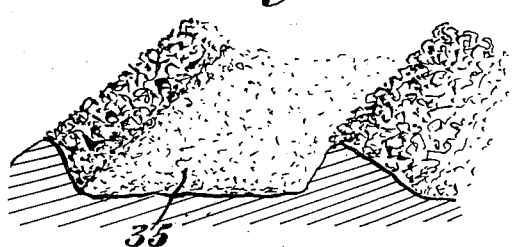
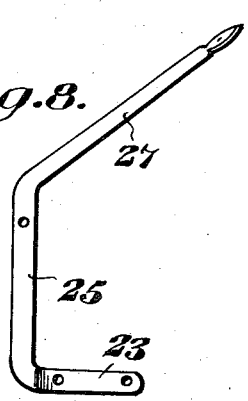
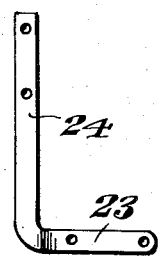
Inventor
Willis W. Austin,
By
Attorney Patented June 30, 1936

2,046,234

UNITED STATES PATENT OFFICE 2,046,234

AGRICULTURAL IMPLEMENT

Willis W. Austin, Yoder, Wyo.

Application February 23, 1935, Serial No. 7,890

10 Claims. (Cl. 55—106)

In the harvesting of beets on a large scale and which are planted in rows, a beet puller is usually employed which digs up the beets and throws them at one side of the puller, together with clods of earth, in the form of a small embankment. After digging, a device on the order of a "stone boat" suitably weighted is dragged over the field in an endeavor to provide a fairly smooth surface alongside the ridge. The beets are then topped by hand and are thrown onto this leveled portion. After that they are picked up either by loading machinery or by hand. In either case it is necessary to separate the beets from weeds and earth clods.

This means not only double equipment, but a very considerable amount of time in first digging the beets and then preparing a bed or surface on which to place them for final collection. More than that a statisfactory clean level surface is not ordinarily obtained, and there being considerable refuse intermixed with the beets, decomposition begins much earlier than if they were free from trash, such as tops, weeds, etc. Moreover beets containing foreign materials, including clods of earth are very injurious to the machinery afterwards employed in cutting up the beets for further treatment.

It is the object of the present invention to provide in connection with beet digging mechanism, means that will immediately form a flat clean path for the reception of the topped beets, said means operating on the earth freshly stirred by the digger, and said digging mechanism thus putting the ground in condition for immediate and easy treatment.

A further object is to provide such a structure that may be either built in as part of the machine or may be employed as an attachment that can be applied to a digger already built.

In the accompanying drawings:

Figure 1 is a perspective view outlining a well-known form of beet digging mechanism and showing the leveling mechanism in place thereon and in operative position.

Figure 2 is a longitudinal sectional view illustrating the leveling mechanism raised to an inoperative position for turning or travel.

Figure 3 is a plan view of the leveler.

Figures 4 and 5 are respectively sectional views on the line 4—4 and 5—5 of Figure 3.

Figure 6 is a view in elevation of one of the leveler-carrying arms.

Figure 7 is a detail sectional view on the line 7—7 of Figure 6.

Figure 8 is a view in elevation of one of the supporting legs for the leveler.

Figure 9 is a similar view of the other leg.

Figure 10 is a detail perspective view illustrating the character of the work done by the digger.

Figure 11 is a similar view of the furrow and mound as usually produced by a digger.

The digging mechanism may be of any suitable type, and in the drawings for illustrative purposes, a frame 12 is provided supported on suitable wheels 13, and adapted to be drawn by animals or a tractor, as desired. The digging mechanism is shown in the form of associated mold boards 14 carried by standards 15, and associated with them are the usual cutting disks 16. As above stated no invention is claimed in this mechanism per se, and it may be modified in various ways.

In the present embodiment this structure is added to by employing rearwardly extending substantially horizontal arms 17 suitably secured to the frame 12, as indicated at 18, and terminating in downwardly turned portions 19, as will be clear by a comparison of Figures 6 and 7. These arms may be of angle iron. A leveling mechanism in the form of a scraper is suspended from the downturned portions 19 of the arms 17.

This scraper consists of rearwardly divergent blades 20 joined together at their front ends by suitable upper plate 21 and a lower plate 22, the joined front edges being substantially vertical. The blades have their upper portions transversely curved outwardly more and more as they approach the rear ends, as will be clear by reference to Figures 3 and 5. Fixed to the inner sides of this scraper are the offset ends 23 of upstanding legs 24 and 25 that are pivoted, as shown at 26, to the depending portions 19 of the arms 17. As illustrated these depending portions may have a plurality of openings to receive the pivots 26 so that the scraper may be placed at different elevations. The leg 25, as shown particularly in Figures 1 and 8, is extended and offset to provide a hand lever 27 by which the scraper can be swung to a lowered substantially horizontal position and a forward and upward upstanding position well above the surface of the ground as will be clear by reference to Figure 2. Preferably there is also provided a draft cable shown in the form of a chain 28 which engages in a notch 29 in the top plate 21 and is secured to an eye-bolt 30 fastened in the lower plate 22. This chain in advance of the scraper is preferably divided, as shown at 31, and the sections thereof are respectively secured, as illustrated at 32, to ears fastened to the arms 17.

Considering now Figure 11 there is shown therein the form which the earth takes in a digging operation. That is to say the beet-digging mechanism produces a depression or furrow 33, and alongside it a mound 34. It has been the custom then to drag alongside this mound by a flattening "stone boat" a sufficiently level place to receive the topped beets, but obviously there will be clods that will not mash down and additionally there are the weeds and other vegetable matter.

With the present structure, and assuming the parts in operative relation, or as illustrated in Figure 1, as the pulling mechanism moves along the row of beets they are elevated from the ground and the freshly stirred earth is immediately followed by the scraper. This scraper provides a flat path substantially as shown in Figure 10, at 35, and not only produces a level bottom or bed, but it removes all trash, including clods and the like, and by reason of the form of the blades it turns the earth over the weeds, so that there is no danger of their falling back into this path. Consequently when the beets are topped and thrown onto this path or bed they are clean and are not mixed with clods or other material. They can thus be easily gathered either by hand or machinery.

From the foregoing, it is thought that the construction, operation and many advantages of the herein described invention will be apparent to those skilled in the art without further description, and it will be understood that various changes in the size, shape, proportion and minor details of construction may be resorted to without departing from the spirit or sacrificing any of the advantages of the invention.

What I claim is:

1. An agricultural implement comprising a vegetable digging mechanism having means for loosening the earth in its digging operation and depositing the dug vegetables on the earth behind said mechanism, and means in rear of the digging mechanism for moving aside the vegetables dug thereby and leveling the earth to provide a relatively clean flat path alongside the dug vegetables.

2. In an agricultural implement, the combination with a carrier frame, of beet digging mechanism supported and carried thereby and depositing the dug beets in line with the row being dug, means mounted on the frame in rear of the digging mechanism for moving aside the beets dug and flattening the earth into a substantially clear path for the reception of the beets dug by the digging mechanism, and means for raising and lowering said mechanism.

3. In an agricultural implement, the combination with a carrier frame, of vegetable digging mechanism supported from the frame and depositing the vegetables on the ground, a supplemental support fixed to and extending rearwardly beyond the frame, and a leveling plow mounted on the extension and operating behind the digger to push aside the dug vegetables and creating a substantially clear path of the earth freshly stirred by the digging mechanism for the reception of the vegetables dug by the digging mechanism.

4. In an agricultural implement, the combination with a carrier frame, of vegetable digging mechanism supported from the frame, a support on the frame fixedly extending rearwardly beyond the same, a leveling plow pivotally mounted on the extension for creating a substantially clear path of the earth freshly stirred by the digging mechanism for the reception of the vegetables dug by the digging mechanism, and means for raising and lowering the plow.

5. In an agricultural implement, the combination with a carrier frame, of beet digging mechanism supported from the frame, spaced arms fixed to the frame and extending rearwardly thereof, a substantially V-shaped earth leveling plow having spaced portions having pivot mountings on the arms, and a lever for swinging the plow on its pivot mountings to raise and lower the plow, said plow when lowered acting to scrape a substantially flat beet receiving path behind the digging mechanism.

6. In an agricultural implement, the combination with a carrier frame, of beet digging mechanism supported from the frame, rearwardly extending arms carried by the frame, and having depending rear ends, a substantially V-shaped earth leveling plow having spaced upstanding legs pivoted to the depending portions of the arms, a lever fixed to one of the legs for swinging the plow between a raised and a lowered operative position, and a draft cable connection between the front end of the scraper plow and the frame.

7. In an agricultural implement, the combination with a movable carrier frame, of mechanism for digging vegetables in rows, and means behind the digging mechanism and operating along the ground for leveling the ground operated on by the digging mechanism, said digging mechanism depositing the dug vegetables substantially in the line of the row dug and on the earth operated on by the leveling means.

8. In an agricultural implement, the combination with a movable carrier frame, of mechanism for digging vegetables in rows and depositing the dug vegetables substantially in the rows dug and behind the digging mechanism, and means behind the digging mechanism and operating along the ground for leveling the ground operated on by the digging mechanism, and sweeping to one side of the ground thus leveled, the vegetables dug by the said digging mechanism.

9. In an agricultural implement, the combination with a wheeled carrier frame, of vegetable digging mechanism carried thereby, fixed arms extending rearwardly from the frame and back of the digging mechanism and having downturned rear portions, a leveling scraper pivotally mounted on the downturned portions, and means for swinging the scraper on the pivot mountings.

10. In an agricultural implement, the combination with a wheeled carrier frame, of vegetable digging mechanism carried thereby, fixed arms extending rearwardly from the frame and back of the digging mechanism, and a leveling scraper having upstanding arms pivoted to the fixed arms, one of the upstanding arms being extended and forming a lever for swinging the scraper.

WILLIS W. AUSTIN.